(12) United States Patent
Gharib et al.

(10) Patent No.: US 6,278,847 B1
(45) Date of Patent: Aug. 21, 2001

(54) APERTURE CODED CAMERA FOR THREE DIMENSIONAL IMAGING

(75) Inventors: Morteza Gharib, San Marino; Dana Dabiri, Altadena; Darius Modares, Palos Verdes, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/258,160

(22) Filed: Feb. 25, 1999

Related U.S. Application Data

(60) Provisional application No. 60/078,750, filed on Feb. 25, 1998.

(51) Int. Cl.[7] .............................. G03B 35/00; G01B 11/24
(52) U.S. Cl. ........................ 396/324; 356/376; 250/201.8
(58) Field of Search ..................................... 356/376, 375; 250/201.4, 201.6, 201.8; 396/324

(56) References Cited

U.S. PATENT DOCUMENTS

| 4,645,347 | 2/1987 | Rioux . |
| 5,018,854 | 5/1991 | Rioux . |
| 5,075,561 | 12/1991 | Rioux . |
| 5,168,327 | * 12/1992 | Yamawaki ............................. 356/376 |
| 5,270,795 | * 12/1993 | Blais ..................................... 356/376 |

* cited by examiner

Primary Examiner—David M. Gray
(74) Attorney, Agent, or Firm—Fish & Richardson P.C.

(57) ABSTRACT

A three-dimensional imaging system uses apertures through which images are projected. The image through each aperture is obtained by a different camera element. The camera elements can be totally physically separate, multiple receiving parts of a single camera, or a single camera which is effectively spatially modulated so that the single camera receives different images at different times. The outputs from the camera are used to form three-dimensional information about the object.

12 Claims, 5 Drawing Sheets

APERTURE CODED CAMERA FOR THREE DIMENSIONAL IMAGING

CROSS REFERENCE TO RELATED APPLICATIONS

This application claims the benefit of the U.S. Provisional Application No. 60/078,750, filed on Feb. 25, 1998.

STATEMENT AS TO FEDERALLY SPONSORED RESEARCH

The U.S. Government may have certain rights in this invention pursuant to Grant No. N00014-97-1-0303 awarded by the U.S. Navy.

BACKGROUND

Different techniques are known for three dimensional imaging.

It is known to carry out three dimensional particle imaging with a single camera. This is also called quantative volume imaging. One technique, described by Willert and Gharib uses a special defocusing mask relative to the camera lens. This mask is used to generate multiple images from each scattering site on the item to be imaged. This site can include particles, bubbles or any other optically-identifiable image feature. The images are then focused onto an image sensor e.g. a charge coupled device, CCD. This system allows accurately, three dimensionally determining the position and size of the scattering centers.

Another technique is called aperture coded imaging. This technique uses off-axis apertures to measure the depth and location of a scattering site. The shifts in the images caused by these off-axis apertures are monitored, to determine the three-dimensional position of the site or sites.

There are often tradeoffs in aperture coding systems.

FIG. 1A shows a large aperture or small f stop is used. This obtains more light from the scene, but leads to a small depth of field. The small depth of field can lead to blurring of the image. A smaller F stop increases the depth of field as shown in FIG. 1B. Less image blurring would therefore be expected. However, less light is obtained.

FIG. 1C shows shifting the apertures off the axis. This results in proportional shifts on the image plane for defocused objects.

The FIG. 1C system recovers, the three dimensional spatial data by measuring the separation between images related to off-axis apertures b, to recover the "z" component of the images. The location of the similar image set is used find the in-plane components x and y.

The current systems have certain drawbacks which are addressed by the present disclosure.

SUMMARY

The present system caries out aperture-induced three dimensional measuring by obtaining each image through each aperture. A complete image detector is used to obtain the entire image. The complete image detector can be a separate camera associated with each aperture, or a single camera that is used to acquire the different images from the different apertures one at a time.

The optical train is preferably arranged such that the aperture coded mask causes the volume to be imaged through the defocusing region of the camera lens. Hence, the plane of focus can be, and is intentionally outside of, the volume of interest. An aperture coded mask which has multiple openings of predefined shape, not all of which are necessarily the same geometry, and is off the lens axis, is used to generate multiple images. The variation and spacing of the multiple images provides depth information. Planar motion provides information in directions that are perpendicular to the depth. In addition, the capability to expose each of the multiple images onto a separate camera portion allows imaging of high density images but also allows proper processing of those images.

BRIEF DESCRIPTION OF THE DRAWINGS

These and other aspects will now be described in detail with the accompanying drawings, wherein.

DESCRIPTION OF THE PREFERRED EMBODIMENT

Figure 1A:
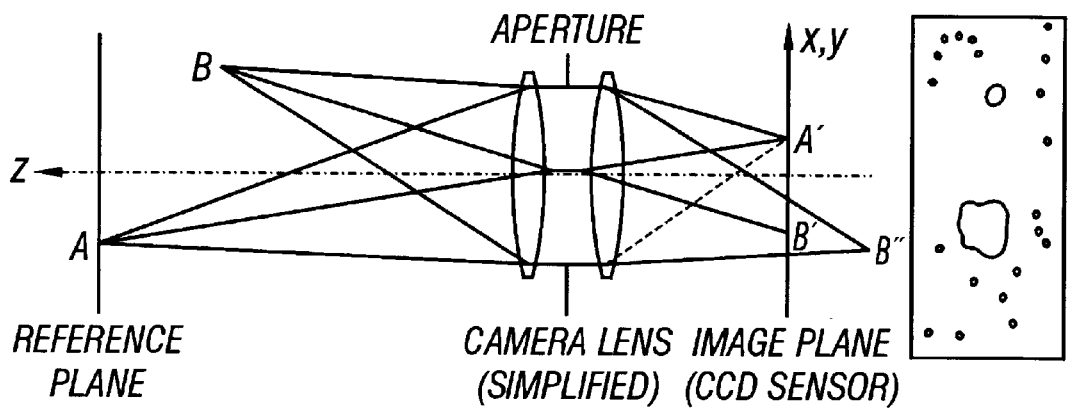
FIGS. 1A–1C show views of different systems for 3 dimensional imaging.
Figure 1B:
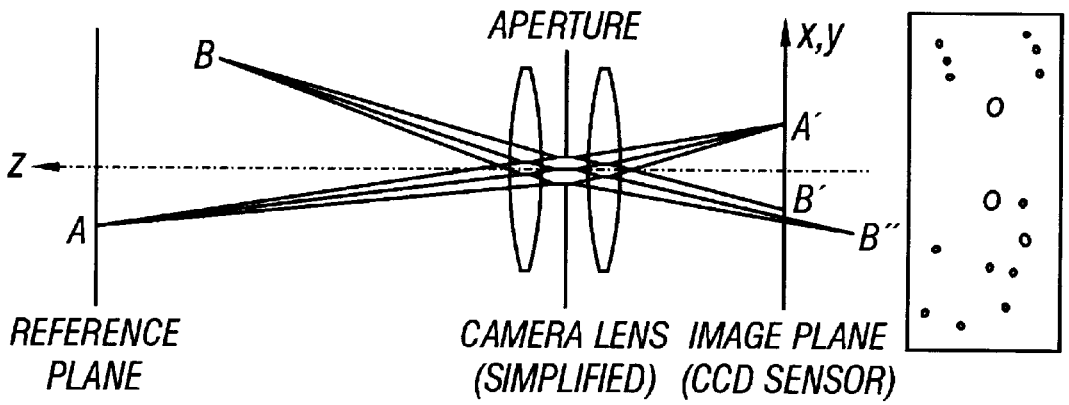
Figure 1C:
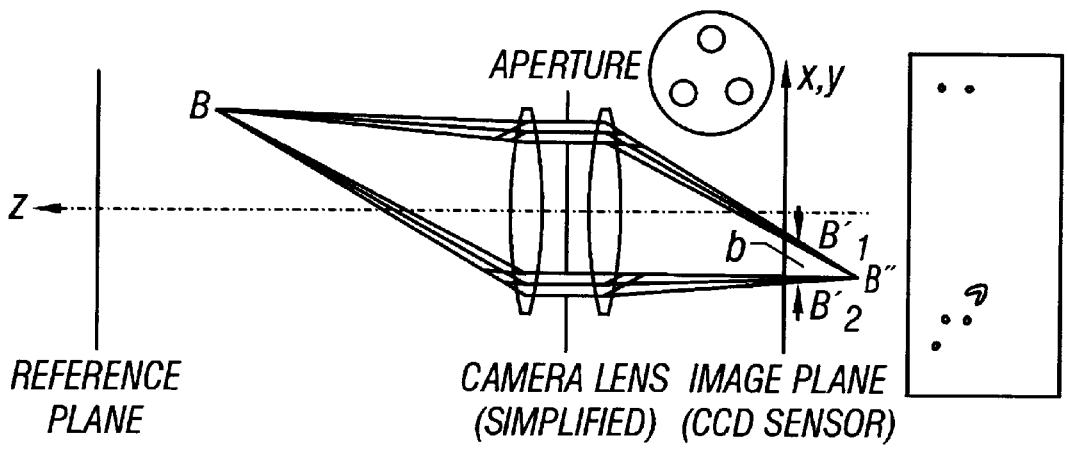
Figure 2:
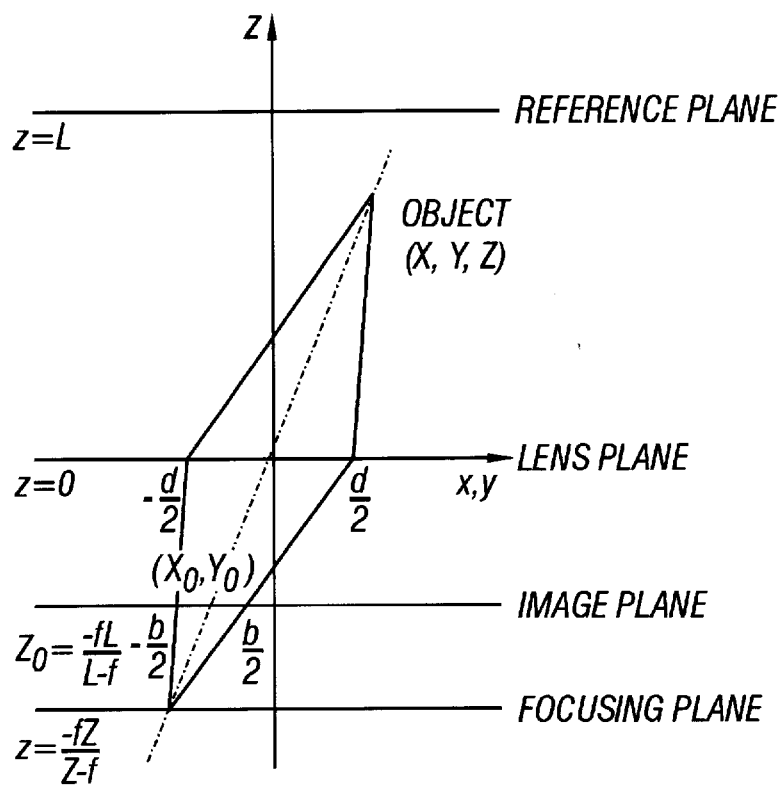
FIG. 2 shows a geometric analysis of a specified lens aperture system.

FIG. 2 shows a geometric analysis in which a camera lens of focal length F is located at z=0. Two small apertures are placed within the lens, separated a distance d/2 away from the optical centerline 200 which also corresponds to the z axis. The apertures are shown as pinholes in this diagram to simplify the model. The theory for larger and more complex apertures would be similar.

The following equations can be determined by using lens laws and self similar triangle analysis:

$$Z = 1/((1/L)+Kb). \quad (1)$$

where $$K = (L-f)/(fdL). \quad (2)$$

The remaining two coordinates x, y are found from the geometrical center ($X_0$, $Y_0$) of the image pair B' using:

$$X = (-x_0 Z(L-f))/(fL) \quad (3)$$

$$Y = (-y_0 Z(L-f))/(fL) \quad (4)$$

Solving (1) for the image separation b reveals several interesting performance characteristics of the lens/aperture system:

$$b = 1/K((1/Z)-(1/L)). \quad (5)$$

The inventors recognized that if all this information was obtained by a single camera, an image crowding problem could exist. This would limit the system to a lower density of number of images.

The defocusing masses requires multiple spatially-shaped holes. If there are n holes, then each scattering site has been imaged n times onto a single CCD. Hence, n times as many pixels are exposed. This means, however, that the capacity of the technique, i.e. the number of scattering sites that can be imaged, is correspondingly reduced by a factor of n.

The present system addresses this and other issues.

A first aspect addresses the image crowding problem by exposing each of the multiple exposures using a separate camera portion. The camera system can be electronic or photographic based. The separate camera portion requires that a whole camera imaging portion is used to obtain the images from each aperture at each time. This can use multiple separate cameras, a single camera with multiple parts, or a single camera used to obtain multiple exposures at different times.

Another aspect obtains image information about the objects at a defocused image plane, i.e. one which is not in focus by the lens. Since the image plane is intentionally out of focus, there is less tradeoff regarding depth of field.

The first embodiment, as described above, uses image separation to expose each of the multiple exposures to its own electronic or photographic camera portion. The image separation can be effected by color filters, by time coding, by spacial filters, or by using multiple independent cameras.

Figure 3:
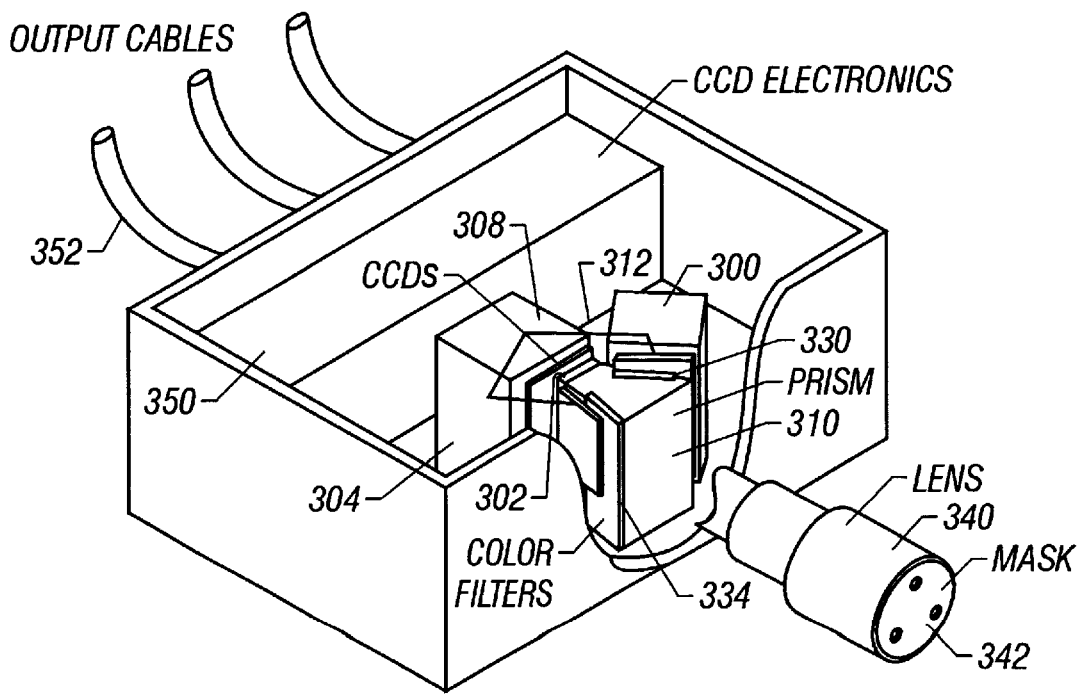
FIG. 3 shows a camera diagram with camera components.

The color filter embodiment is shown in FIG. 3. A color camera and mask combination is shown with three separate CCD cameras 300, 302, 304.

Light is input through mask 342, which includes an opaque aperture plate with three apertures formed therein. In this embodiment, the apertures are generally in the shape of a triangle. The light passes to a lens assembly 346, which directs the light into the chamber that houses the camera.

The color camera uses three monochrome CCD cameras, situated around a three way prism 310 which separates the incoming light according to its colors. A micro positioner assembly 312 is provided to precisely adjust the cameras 300, 302, 304 such that each will view exactly the same area. Once those adjustments are made, the three cameras are locked into place so that any vibration affects each of them the same. Each camera includes an associated band filter. The filter 330 is associated with CCD camera 300, filter 332 is associated with camera 302, and filter 334 is associated with camera 304. Each of these narrow band filters passes only one of the colors that is passed by the coded apertures. The filters are placed adjacent the prism output to correspond respectively to each of the primary colors, e.g. red, green and blue. Hence, the filters enable separating the different colors.

This color camera assembly is used in conjunction with an image lens assembly 340 and a aperture coded mask 342. The system in FIG. 3 shows the aperture coded mask having three mask portions in the form of an equilateral triangle. Each aperture is color coded according to the colors of the camera filters. This color coding can be done by, for example, using color filters on the apertures.

The image from each aperture goes to a separate one of the cameras 302, 304, 300. The output from the camera is processed by the CCD electronics 350 and coupled to output cables shown as 352. These three values are processed using a conventional processing software. The three values can be compensated separately.

While the system describes using three colors and three apertures, it should be understood that any number of colors or apertures could be provided.

A second embodiment separates the images from the different apertures using rapid sequential imaging. An embodiment is shown in FIG. 4. A scene is imaged through a mask 400 that includes multiple apertures. Each aperture has an associated selective blocking means 402. The blocking means is a device that either allows light to pass through the aperture or blocks light from passing through the aperture under control of an applied control signal 404 from a control element 400. The aperture blocking means 402 can be a mechanical blocker e.g. a mechanical shutter, solid state optics, such as a liquid crystal which is selectively allowed to pass light, or a digital mirror which selectively reflects the light to the aperture or the like. Light from the scattering sites 410 is allowed to pass through each aperture at a separate time, under control of the controller 406. The passed light is sent to a single camera 430 that produces an image indicative of the passed light. Three different images are obtained at three different times. Each image is based on passage of the light through a different aperture.

Alternate ways of obtaining the three images could be used. A purely mechanical means can be provided to pass light through only a single aperture by rotating the blocking element such that the blocking element is associated with different apertures at different times and hence provides different illuminations at different times.

Figure 4A:
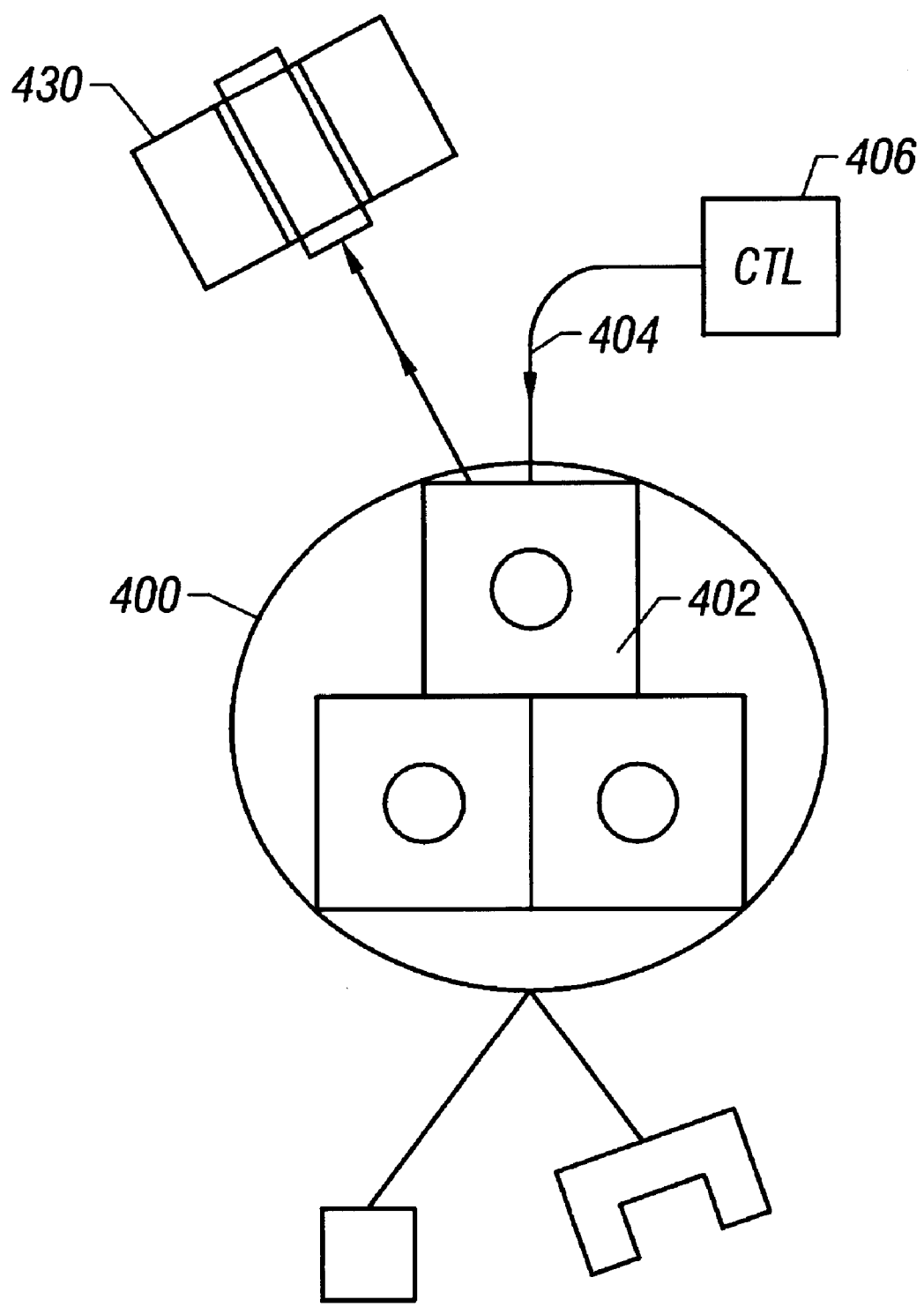
FIG. 4 shows a drawing of the preferred camera.

In either case, each of the corresponding cameras is exposed only when the corresponding aperture is allowed to receive light. The system shown in FIG. 4A shows a CCD camera assembly 430 receiving the light from the various apertures.

Figure 5:
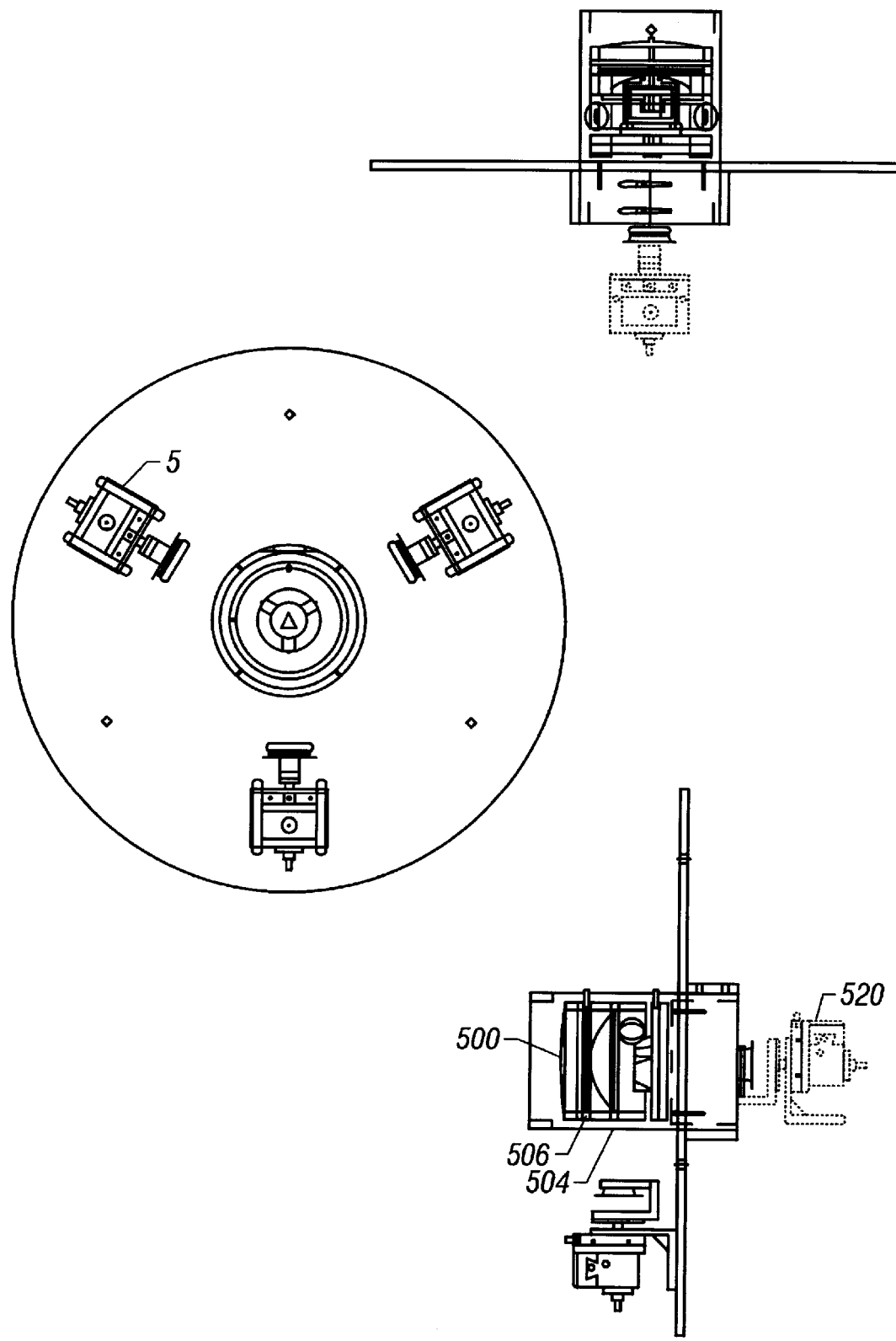
FIGS. 5 and 6 shows more detailed drawings of the optical relays of the camera shown in FIG. 4.
Figure 6:
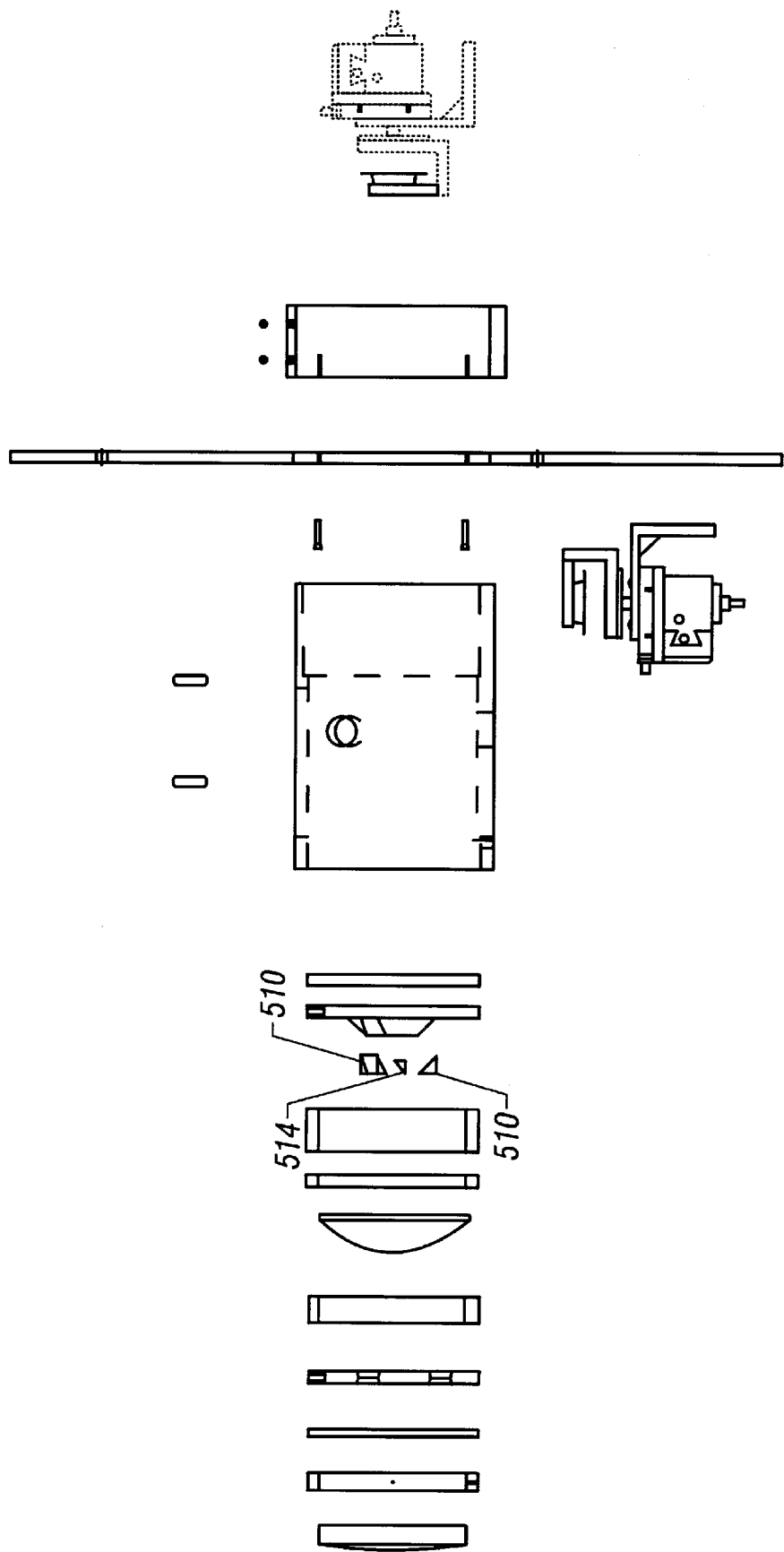

Another embodiment uses spacial filters to separate the different light values. FIG. 5 shows a preferred configuration of a spatially coded camera. The system includes a focusing lens assembly 500, 504, with an aperture system 506 between the two portions of the focusing lens 500, 504. An exploded view of the components is shown in FIG. 6. Each of the prisms 510, 512, 514 is directly located behind each aperture orifice. A three CCD camera 520 views the three images through the three aperture orifices, thereby providing three simultaneous views of the image.

The lenses within the focusing lens assembly 500, 504 direct the scattered light from the scene through each of the three orifices at 120° angles with each other. The light is then collected through the aperture orifices and directed to the separate CCD cameras. Each of the images on each of the three cameras is recorded simultaneously and then processed to provide three dimensional spacial locations of the points on the scene.

An alternative, but less preferred embodiment, uses three separate cameras, in place of the one camera described above.

The system as described and shown herein includes several advantages. The system allows superior camera alignment as compared with other competing images such as stereoscopic techniques. This system is also based on a defocusing technique as compared with stereoscopic techniques that require that the camera be focused on the area of interest. This system has significant advantages since it need not be focused on the area of interest, and therefore has fewer problems with trade offs between aperture size and other characteristics.

Although only a few embodiments have been described in detail above, other embodiments are contemplated by the inventor and are intended to be encompassed within the following claims. In addition, other modifications are contemplated and are also intended to be covered. For example, different kinds of cameras can be used. The system can use any kind of processor or microcomputer to process the information received by the cameras. The cameras can be other types that those specifically described herein. Moreover, the apertures can be of any desired shape.

What is claimed:

1. A method of three dimensionally imaging at least one site, comprising:

imaging the site through a camera lens assembly;

restricting an overall size of a scene that is imaged through the lens, by allowing light to pass only through a plurality of apertures of specified shapes;

associating each of the plurality of apertures with a separate camera portion, such that light which passes through each aperture is imaged by an entire camera portion;

wherein said different camera portions comprise separate cameras which each obtain an image through a corresponding camera aperture; and analyzing said light from each of the camera portions, to determine three dimensional object information about the object.

2. A method as in claim 1 wherein said apertures includes three apertures arranged in a substantially triangular shape.

3. A method as in claim 1 wherein said imaging comprises imaging the system through a defocused portion of the lens.

4. A three-dimensional camera device, comprising:

a lens system, having an in-focus portion and an out-of-focus portion;

an aperture plate, defining at least a plurality of apertures through which light passes, a remainder of said aperture plate being substantially opaque to light so that light does not pass through said remainder of said aperture plate;

a camera system, operating to obtain an image of a scene which has passed through said apertures wherein said camera system includes three separate cameras; and a controller, said controller controlling said camera such that each aperture is associated with a separate camera portion which includes substantially an entirely of said camera portion taking an image through each aperture at a specified time.

5. A device as in claim 4 wherein said lens assembly is located in a location whereby the volume to be imaged is located in a defocusing region of the lens.

6. A device as in claim 4 further comprising elements for color coding said apertures, and wherein said camera includes a prism device which separates incoming light according to colors, and directs different color incoming light to different ones of the cameras.

7. A device as in claim 6 wherein each of the cameras is a monochrome camera.

8. A device as in claim 6 further comprising a micro positioner element, operable to position the cameras such that each will view exactly the same area.

9. A device as in claim 8 further comprising an element which locks the micro positioner into place in a way such that vibration affects each of the cameras in substantially the same way.

10. A device as in claim 6 further comprising a plurality of narrow band optical filters, placed adjacent the prism output, and which passes only one of the colors associated with the colors coded by said aperture.

11. A device as in claim 10 wherein said colors coded by said aperture include red, green, and blue colors.

12. A device as in claim 4 wherein said apertures are substantially circular in shape.

* * * * *

UNITED STATES PATENT AND TRADEMARK OFFICE
CERTIFICATE OF CORRECTION

| | | |
|---|---|---|
| PATENT NO. | : 6,278,847 B1 | Page 1 of 1 |
| APPLICATION NO. | : 09/258160 | |
| DATED | : August 21, 2001 | |
| INVENTOR(S) | : Morteza Gharib, Dana Dabiri and Darius Modarress | |

It is certified that error appears in the above-identified patent and that said Letters Patent is hereby corrected as shown below:

On the Title Page, Item (75) "MODARES" should be changed to --MODARRESS--

Signed and Sealed this

Twenty-first Day of June, 2011

David J. Kappos
*Director of the United States Patent and Trademark Office*